(12) United States Patent
Johnson

(10) Patent No.: US 8,310,379 B2
(45) Date of Patent: Nov. 13, 2012

(54) MONITORING DEVICE FOR A TRACKING SYSTEM

(75) Inventor: Brian Johnson, Surprise, AZ (US)

(73) Assignee: Deutsche Post AG, Bonn (DE)

( * ) Notice: Subject to any disclaimer, the term of this patent is extended or adjusted under 35 U.S.C. 154(b) by 504 days.

(21) Appl. No.: 12/532,488

(22) PCT Filed: Mar. 19, 2008

(86) PCT No.: PCT/EP2008/002204
§ 371 (c)(1),
(2), (4) Date: Sep. 22, 2009

(87) PCT Pub. No.: WO2008/113578
PCT Pub. Date: Sep. 25, 2008

(65) Prior Publication Data
US 2010/0102993 A1    Apr. 29, 2010

Related U.S. Application Data

(60) Provisional application No. 60/919,714, filed on Mar. 22, 2007.

(51) Int. Cl.
*G08G 1/123* (2006.01)
(52) U.S. Cl. .................. 340/988; 340/10.1; 340/825.49
(58) Field of Classification Search .............. 340/988, 340/572.1–572.9, 10.1, 825.54, 539.1, 568.1, 340/825.49
See application file for complete search history.

(56) References Cited

U.S. PATENT DOCUMENTS

| | | | |
|---|---|---|---|
| 4,750,197 A * | 6/1988 | Denekamp et al. | 455/404.2 |
| 5,347,274 A * | 9/1994 | Hassett | 340/988 |
| 5,959,568 A * | 9/1999 | Woolley | 342/42 |
| 7,538,657 B2 * | 5/2009 | Twitchell, Jr. | 340/10.1 |
| 2005/0005874 A1 * | 1/2005 | Light et al. | 119/719 |
| 2005/0110639 A1 * | 5/2005 | Puzio et al. | 340/572.1 |
| 2009/0119770 A1 | 5/2009 | Soliman et al. | |

FOREIGN PATENT DOCUMENTS

WO    WO 00/19235 A1    4/2000
(Continued)

OTHER PUBLICATIONS

PCT International Search Report for PCT/EP2008/002204, International Filing Date Mar. 19, 2008.

(Continued)

*Primary Examiner* — Daniel Previl
(74) *Attorney, Agent, or Firm* — International IP Law Group, PLLC

(57) ABSTRACT

A monitoring device for a tracking system is described. The device includes a: communication circuit for communication with radio frequency identification (RFID) tag on an article to-be transported by the vehicle, and a-position system (PS) circuit for determining vehicle location. The device includes a control circuit having a microprocessor and a memory, and electrically connected to the communication and PS circuits. The microprocessor acquires tag data and location in memory, and operates the communication circuit to: interrogate tag, operate the PS circuit to determine vehicle location, and associate tag data with vehicle location The device includes an alarm electrically connected to the microprocessor. The device determines, approximates, distance from the tag to device, based on received signal strength, or time delay in receiving the tag's response, and activates the alarm if a distance threshold from tag to device is exceeded. This threshold is lower than the maximum range of the tag.

20 Claims, 1 Drawing Sheet

FOREIGN PATENT DOCUMENTS

WO        WO 02/44865 A2     6/2002
WO        WO 2005/065363 A2     7/2005

OTHER PUBLICATIONS

Australian Patent Office, Written Opinion, Application No. SG 200905678-9, Filed Mar. 19, 2008, mailing date: Dec. 13, 2010, pp. 6, English language.

Elnahrawy, Eiman, et al., The Limits of Localization Using Signal Strength: A Comparative Study, IEEE, 2004, pp. 10, English language.

Hancke, Gerhard P., et al., An RFID Distance Bounding Protocol, Proceedings of IEEE/Create-Net SecureComm 2005. Sep. 5-9, 2005, Athens Greece, pp. 67-73, IEEE Computer Society Press, Los Alamitos, California, USA ISBN 0-7695-2369-2, pp. 8, English language.

* cited by examiner

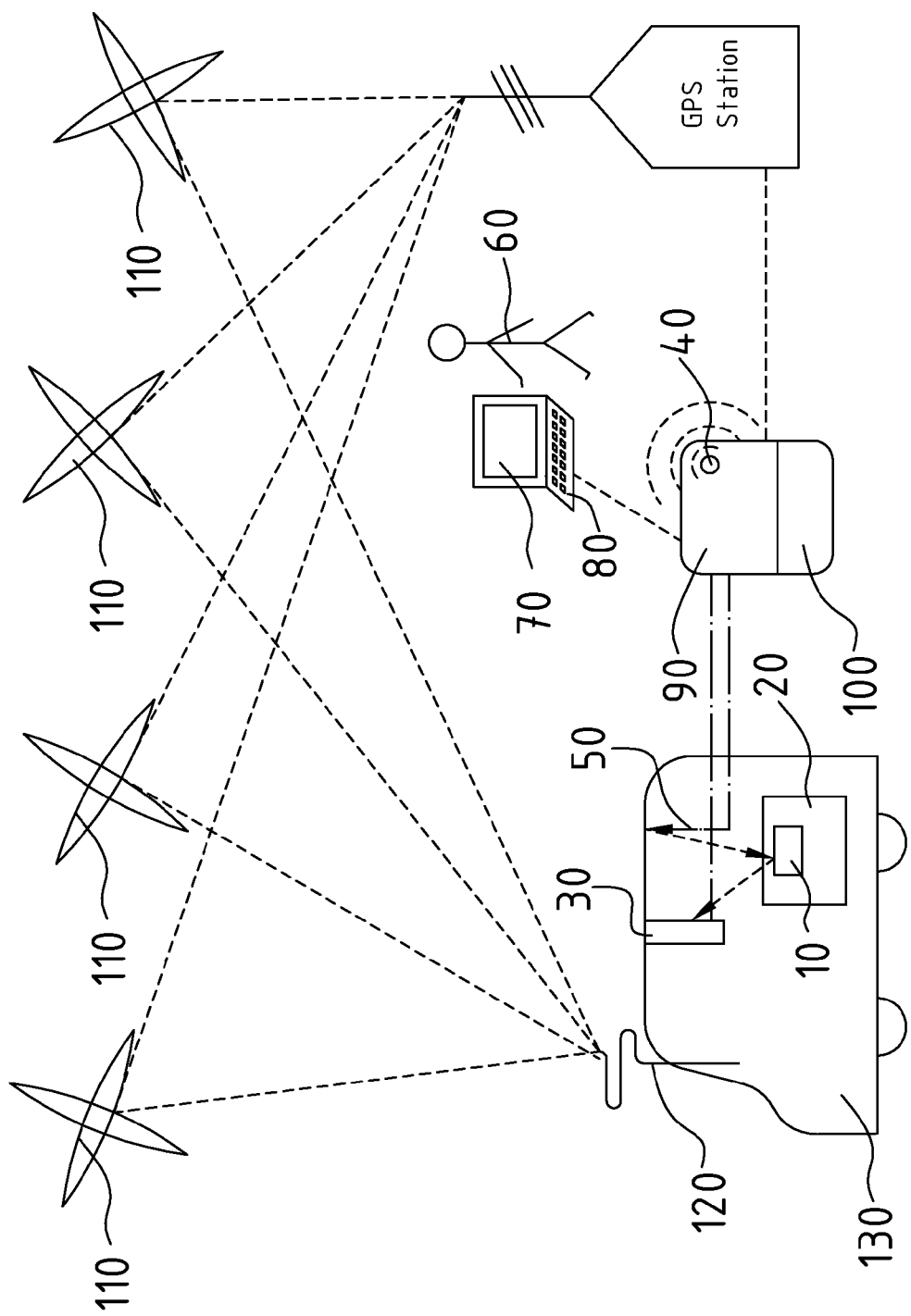

MONITORING DEVICE FOR A TRACKING SYSTEM

CROSS REFERENCE TO RELATED APPLICATIONS

Pursuant to 35 U.S.C. §371, this application is the United States National Stage Application of International Patent Application No. PCT/EP2008/002204, filed on Mar. 19, 2008, the contents of which are incorporated by reference as if set forth in their entirety herein, which is entitled to the benefit of U.S. Provisional Patent Application No. 60/919,714, filed Mar. 22, 2007, the contents of which are incorporated by reference as if set forth in their entirety herein.

BACKGROUND

Providing a high level of tracking visibility when articles, e.g. mailed items, packages, cargo etc., are transported by vehicles is a task which has been faced for a long time. Such articles may be easily lost or stolen if accidentally unloaded, left behind or misplaced. With a higher tracking visibility of the articles it is possible to reduce the number of lost or stolen articles.

Various individual sensors for tracking an article have been on the market for quite some time. One approach to the problem are finder systems that have been developed, wherein an alarm RFID tag is fastened to an article and sounds when commanded by a signal, such as a radio signal, from an alarm control station. When the article is lost, a signal is broadcast from a base station to activate the alarm RFID tag and sound the alarm. The article may then be found by following the sound of the alarm RFID tag.

While article finder systems can be a great help in finding lost articles, the article finder systems are typically used in reaction to a loss of a single article and not in a manner to prevent the loss of a multitude of articles. Typical of the article finder systems is the need to manually initiate an action to find the lost article. Additionally, the article finder RFID tag requires a power source such as a battery to continuously power a receiver and to power an alarm or transmitter. The article finder RFID tag ceases to function when its battery dies, rendering it useless.

Instead of locating a single article after it has been lost, it is preferable in many circumstances to prevent the loss of an article or, even better of a multitude of articles. Thus, a tracking system that signals when an article is removed from a given area, or that signals when an article is left behind, is desirable to help in preventing the article from becoming lost.

SUMMARY OF THE INVENTION

Exemplary embodiments of the present invention relate to a monitoring device for a tracking system as well as to a tracking system adapted for use in at least one vehicle. More specifically, exemplary embodiments of the present invention relate to a tracking system wherein a monitoring device continuously and automatically controls electronically RFID (radio frequency identification) tagged articles to be transported in the vehicle and eventually sounds an alarm when one or more RFID tagged articles are removed from the proximity to the monitoring device.

The monitoring device for a tracking system adapted for use in at least one vehicle according to the invention comprises:

A communication circuit adapted for communication with at least one RFID (radio frequency identification) tag on an article to be transported by the vehicle;

A PS (position system) circuit adapted for determining a location of the vehicle, A control circuit having a microprocessor and a memory, the control circuit being electrically connected to the communication circuit and the PS circuit;

A computer readable program code stored in the memory and executing under control of the microprocessor, the program code being adapted to acquire the RFID tag data and the location data in the memory, to operate the communication circuit to interrogate the RFID tag, to operate the PS circuit to determine a location of the vehicle, and to associate the RFID tag data with the location data of the vehicle.

With the aid of the monitoring device for a tracking system adapted for use in at least one vehicle as well as a tracking system equipped with such a monitoring device the overall package tracking visibility and vehicle localization may be increased enormously. As an effect a dynamic and therefore optimized routing of couriers and rerouting of packages is possible.

An exemplary monitoring device is based on RFID (radio frequency identification) but other communication methods are also possible, e.g. communication via cellular, WLAN (wireless local area network), or satellite communication methods.

RFID is a method for automatically identifying and localizing articles, which works wireless and without imaging of the articles. Systems based on RFID principally comprise a transponder, e.g. a RFID tag for identifying the article, a scanner for scanning the RFID tag, preferably comprising an antenna, and RFID middleware with interfaces to other computer systems and databases. Scanning of a transponder, e.g. a RFID tag, in its vicinity works by coupling of inductivities or capacitance. For long distances the scanning is performed by transmission of electromagnetic waves.

The RFID tags may comprise passive, semi-passive, or active RFID tags that respond, when interrogated by the monitoring device, with a unique identification code. The passive RFID tags contain no power source, deriving power inductively from the RF (radio frequency) signal transmitted by the monitoring device. The range of a passive RFID tag varies from a few inches to a few meters, depending on the monitoring device power output, the sensitivity of the monitoring device's receiving antenna, the operating frequency, the antenna designs of both the monitoring device and the RFID tag, and other factors. Semi-passive RFID tags include a battery or power source to power a transmitter in response to the RF signal transmitted by the monitoring device, allowing the RFID tag to send its reply over a longer distance. Active RFID tags employ a battery or power supply that powers the RFID tag's receiver, transmitter, and other circuitry, allowing a more sensitive receiver and providing a transmitter with higher power to give the active RFID tag a maximum range. Thus, passive, semi-passive, or active RFID tags may be employed individually or in combination to provide for short, medium, or long usable range with a given monitoring device.

PS (global position system) is a wide spread standard for vehicles especially in use for navigation purposes.

RFID tags can be affixed by a person or automatically to commonly transported articles, i.e. items such as an envelope, a package, a box, a container and others.

In an exemplary embodiment of the present invention, the monitoring device further comprises a user interface, e.g. simple web interface, for displaying messages to and receiving input from a user, the user interface being electrically connected to said control circuit. The interface may enable a user, e.g. an employee, to draw up a periodical package inventory that can be dynamically completed as the vehicle is in transit to a scheduled destination.

In a further exemplary embodiment, the microprocessor is adapted to generate a time stamp related to the RFID tag data and the location data. The term time stamp may include data referring to time, e.g. local time with respect to the vehicle's actual location, and/or date.

Information comprising the RFID tag data and the location data as well as a corresponding time stamp may be displayed to a user as real-time data or on demand as historic data. Data provided as real-time data may eventually enable intervention when an alarm activates, e.g. by a small audible siren. Data provided as historic data may enable a user to draw up reports and/or statistics.

The microprocessor may be adapted to generate a time stamp related to the RFID tag data and the location data in regular time intervals and storing the data in the memory. This feature has the effect that said articles are tracked regularly at several times besides the time of the recent handling by the staff or distribution facility.

In another exemplary embodiment of the present invention, the microprocessor is adapted to generate a time stamp related to the RFID tag data and the location data when the article associated to the RFID tag enters the vehicle and/or leaves the vehicle and storing the data in the memory. The time of an article entering the vehicle and the time of an article leaving the vehicle are crucial with respect of the danger of the article getting misplaced and lost. Therefore, RFID tag data and location data related to the time of an article entering the vehicle and the time of an article leaving the vehicle is of high importance for immediate activation of an alarm and/or informative reports.

Status reports are preferably generated and evaluated with respect to at least one article. But reports may also be generated for a certain category of articles, e.g. packages with a certain maximum weight, for a certain vehicle type, for a certain time interval, a certain courier etc.

The status reports may include data selected from the group of the following parameters: temperature within the vehicle, moisture/humidity within the vehicle, air pressure within the vehicle, technical condition parameters providing information about engine problems, e.g. vehicle speed, vibration, remaining fuel, breaks in transit, location, loading situation, e.g. number of packages loaded, of the vehicle.

The monitoring device favourably comprises an alarm electrically connected to the microprocessor and may be adapted to cause the alarm to activate when the RFID tag is out of range of the communication circuit. Therefore, the monitoring device may periodically interrogate each RFID tag with a transmitted RF signal, and generate an alarm signal if an interrogated RFID tag is out of range or does not reply.

In another exemplary embodiment, said program code is further adapted to drop the RFID tag by deleting the RFID tag data from the memory. This may be of interest for a user if the article corresponding to the RFID tag has been transported and delivered to a customer or is of no importance any more for other reasons.

The communication circuit may comprise a wireless network interface adapter. This feature might enable access to tracking data for the staff as well as for certain users which may have an individual access profile restricted to selected data related to their package.

The communication circuit may comprise a transmitter that is adapted to broadcast an RF signal to the RFID tag and a receiver that is adapted to receive an RF signal from the RFID tag.

Said alarm may comprise an audible alarm, e.g. generated by a small siren, but also a visual alarm, e.g. generated by a blinking lamp, or a tactile alarm are possible. An alarm can also be caused to activate on a user's terminal when a pick-up is scheduled. In this case the alarm can be realized as an email or SMS message, and a response from the user via the wireless network interface is possible. Besides the alarm can be caused to additionally activate on a courier's terminal when a vehicle maintenance date is due.

Email or SMS messages can be displayed on predetermined user terminals either containing an alarm message or other important status information.

The monitoring device may be designed for use with either rechargeable, non-rechargeable or vehicle power source or combinations thereof.

The monitoring device may also be adapted to collect data from on-board sensors and to eventually cache the data until the data is needed to complete RFID tag data, location data and a time stamp.

Exemplary embodiments of the present invention may be adapted to provide a tracking system for use in at least one vehicle, comprising at least one RFID (radio frequency identification) tag and a monitoring device including:

A communication circuit adapted for communication with the at least one RFID tag on an article to be transported by the vehicle;

A PS (position system) circuit adapted for determining a location of the vehicle, A control circuit having a microprocessor and a memory, the control circuit being electrically connected to the communication circuit and the PS circuit;

A computer readable program code stored in the memory and executing under control of the microprocessor, the program code being adapted to acquire the RFID tag data and the location data in the memory, to operate the communication circuit to interrogate the RFID tag, to operate the PS circuit to determine a location of the vehicle, and to associate the RFID tag data with the location data of the vehicle.

Said monitoring device and said RFID tag of the tracking system may both be adapted for communication in a wireless personal area network.

The tracking system as well as the monitoring device according to an exemplary embodiment of the present invention may make use of a variety of communication methods, including cellular, WLAN, satellite or RFID scans.

The monitoring device may include a base station that interacts with an RFID tag. The base station comprises an RF transmitter, receiver, and antenna, along with a control unit. The control unit sends a monitoring signal that is received by the RFID tag. The RFID tag is inductively powered by the monitoring signal and responds with an identity signal. Because of the limited range of the monitoring signal and the identity signal, removal of the RFID security RFID tag from proximity to the base station causes the identity signal not to be received by the base station. Thus, when the base station sends a monitoring signal but no identity signal is received in response, an alarm is sounded. In this manner, the security apparatus functions to sound an alarm when a RFID tagged item is removed from proximity to the base station.

An exemplary monitoring device stores an identification code for each RFID tag that is to be monitored. Each RFID tag may be stored along with address data or an alias to identify the RFID tag so that if a RFID tagged item is removed from the vicinity of the monitor, the RFID tag's address data or alias can be displayed along with the alarm in order to help to identify the item. Each RFID tag may also have a specified sensitivity that defines the distance threshold beyond which the alarm is sounded. In addition to the maximum physical range for each type of RFID tag, a RFID tag's distance from the monitoring device may be determined or approximated based on the received RFID tag signal strength, time delay in receiving the RFID tag's response to interrogation, or by other methods.

The monitoring device may employ the microprocessor to operate a monitoring device transceiver, to manage the RFID tags, and to drive a user interface. The microprocessor allows a user to interactively add or remove the RFID tag identification codes from the monitoring device memory, and to activate and deactivate stored RFID tags.

BRIEF DESCRIPTION OF THE DRAWING

FIG. 1 is a block diagram of a tracking system according to an exemplary embodiment of the present invention.

DETAILED DESCRIPTION OF SPECIFIC EMBODIMENTS

Illustrated in FIG. 1, an exemplary tracking system adapted for use in a vehicle 130 includes a monitoring device that communicates with a RFID (radio frequency identification) tag 10, which may also be referred to as transponder that may be affixed to, or contained within, an article 20 to prevent the loss of the article.

The monitoring device periodically interrogates the RFID tag 10, sending an RF signal from a RFID antenna 50 that is received by the RFID tag 10. When interrogated, the RFID tag 10 sends a response to the RFID reader 30, the response including a unique identification code. The RFID reader 30 verifies that the RFID tag 10 responds to the interrogation. If the RFID tag 10 does not respond to the interrogation, the monitoring device sounds an alarm. Thus, given a finite distance that the RFID antenna 50 of the monitoring device can transmit its interrogation signal, as well as a (typically shorter) finite range that the RFID tag 10 can transmit its response, when a RFID tag 10 is removed a sufficient distance away from the monitoring device, the RFID reader 30 will no longer receive the RFID tag's 10 response and will therefore sound an alarm for the RFID tag 10.

The monitoring device includes RF circuitry for communicating with the RFID tag 10, and control circuitry for controlling the RF circuitry, managing RFID tag identification codes, and monitoring the RFID tag 10. The monitoring device also includes PS circuitry for communicating with satellites 110, and control circuitry for controlling the PS circuitry, managing signal transfer via PS transponders 120 and a PS station and generating the vehicle's 130 location data from the signals.

The PS circuitry for communicating with satellites 110 can utilize different positioning systems.

One suitable way for implementing a PS circuitry as a position determination device is the usage of a receiver according a global navigation satellite system.

Global Navigation Satellite System (GNSS) is the standard generic term for satellite navigation systems that provide autonomous geo-spatial positioning with global coverage. A GNSS allows small electronic receivers to determine their location (longitude, latitude, and altitude) to within a few meters using time signals transmitted along a line of sight by radio from satellites. Receivers on the ground with a fixed position can also be used to calculate the precise time as a reference for scientific experiments.

As of 2007, the United States NAVSTAR Global Positioning System (GPS) is the only fully operational GNSS. The Russian GLONASS is a GNSS in the process of being restored to full operation. The European Union's Galileo positioning system is a next generation GNSS in the initial deployment phase, scheduled to be operational in 2010.

Alternatively it is possible to use position sensors functioning with different methods. For example, it is possible to determine the position between the transponder and one or more readers.

It is possible to use at least one module operating according to a RFID standard, a WIFI standard, or a mobile communication standard as Bluetooth, GPRS, GSM or UMTS or capable of performing satellite communication. The usage of a Bluetooth module, a GSM module, GPRS or a UMTS module is especially advantageous as it allows a determination of the position as well as a transmission of a measured data.

The usage of the transponder combines the advantages of a position determination with a transmission of data.

It is possible to combine one or more different position determination methods.

The monitoring device also comprises circuitry for interacting with a user 60. The user interface includes a display 70, such as a plurality of simple light emitting diodes (LED), alpha-numeric LEDs, a flat panel display such as a liquid crystal display (LCD), or other display type, along with an input device 80 such as a plurality of pushbuttons, a touch screen function incorporated in the display, a keyboard, or a device for voice control. A flat panel LCD display is preferred.

The exemplary monitoring device's RF circuitry includes a modulator and transmitter, along with an RF regulator, a modulation adjustment circuit, and oscillator and timing circuits to generate, encode, and transmit the interrogation signal. Additionally, the RF circuitry includes receiver, filtering, demodulating, and anti-collision circuitry to receive the responses from the RFID tag 10 and to resolve collisions when two or more RFID tags reply at the same time.

The exemplary monitoring device's control circuitry includes a microprocessor 90 and a memory 100, including random access and read only memory (RAM/ROM), and an electrically erasable programmable read only memory (EEPROM). The microprocessor program code is stored in the memory 100, and controls the operation of the monitoring device.

An alarm generating device 40, connected to the microprocessor 90, provides an audible, visual, or tactile alarm signal. The alarm generating device 40 may be a speaker or buzzer or other sound source, a light source, a vibrator, or a combination of these. A battery or power supply provides power for the monitoring device.

The microprocessor program code controls the operation of the monitor's RF circuitry, directing the RF circuitry to send an interrogation signal to the RFID tag 10 and processing replies from the RFID tag 10. Additionally, the microprocessor program code performs management of the RFID tag identification codes, and performs user interface functions related to setup and operation of the monitoring device.

A passive RFID tag 10 is the simplest of the RFID tags, comprising a semiconductor-based RFID component along with an associated antenna or coil. The RFID component typically includes a receiver/demodulator for receiving and demodulating the RF interrogation signal, and a transmitter/ modulator for modulating and transmitting the RFID tag's RF reply. The memory 100 stores the RFID tag's unique identification code. The passive RFID tag 10 has no battery, but is powered inductively by the RF energy emitted from the monitoring device. With no battery, however, the passive RFID tag 10 is the most limited in range because of its limited ability to transmit a response, limitations of the receiver/demodulator, and the sensitivity of the monitoring device 10 to detect weak responses.

Using either the passive RFID tag 10, semi-passive RFID tags, or active RFID tags, the monitoring device can track various articles within a close range (using a passive RFID tag 10), a medium range (using semi-passive RFID tags), and a relatively longer range (using active RFID tags).

The microprocessor code operates the display 70 and input device 80 to interact with the user 60, and controls the operation of the monitoring device to perform monitoring of the RFID tag 10.

Once a certain timeout interval has elapsed, the microprocessor code determines if all of the acquired RFID tags have responded. If one or more acquired RFID tags have not responded, then an alarm is eventually to be set. A threshold test may be applied before in order to determine if a RFID tag 10 has failed to respond to a predetermined number of consecutive interrogations, or has failed to respond to interrogations for a predetermined time interval. The threshold test insures that no false alarm is issued for a RFID tag 10 that, although within range of the monitoring device, for some reason fails to respond to a single or small number of interrogations. If the threshold is exceeded for the RFID tag 10, an alarm is set.

With an understanding of an RFID embodiment of the tracking system, it can be appreciated that the system may be implemented with alternative wireless communication network technologies. What is important is that the monitoring device has the ability to determine when a RFID tag 10 has moved beyond a limited range of communication with the monitoring device.

It is to be understood that the present invention is not limited to the exemplary embodiments described above, but encompasses any and all embodiments within the scope of the following claims.

Reference Numbers
10 RFID (radio frequency identification) tag
20 article
30 RFID reader
40 alarm generating device
50 RFID antenna
60 user
70 display
80 input device
90 microprocessor
100 memory
110 satellite
120 PS transponder
130 vehicle

What is claimed is:

1. A monitoring device for a tracking system adapted for use in at least one vehicle, comprising:
a communication circuit adapted for communication with at least one radio frequency identification (RFID) tag on an article to be transported by the vehicle;
a position system (PS) circuit adapted for determining a location of the vehicle;
a control circuit having a microprocessor and a memory, the control circuit being electrically connected to the communication circuit and the PS circuit, the microprocessor being adapted to acquire the RFID tag data and the location data in the memory, to operate the communication circuit to interrogate the RFID tag, to operate the PS circuit to determine a location of the vehicle, and to associate the RFID tag data with the location data of the vehicle;
an alarm electrically connected to the microprocessor; and
whereas the monitoring device is adapted to determine or approximate the distance of the RFID tag from the monitoring device based on a time delay in receiving the RFID tag's response to interrogation and to activate the alarm if a distance threshold of the RFID tag from the monitoring device is exceeded, whereas this distance threshold is lower than the maximum physical range of the RFID tag, wherein the microprocessor is arranged to perform a threshold test before an alarm is set, wherein the threshold test determines if the RFID tag has failed to respond to a predetermined number of consecutive interrogations or has failed to respond to interrogation for a predetermined time interval.

2. The monitoring device recited in claim 1, comprising a user interface device that is adapted to display messages to and to receive input from a user, the user interface device being electrically connected to the control circuit.

3. The monitoring device recited in claim 1, wherein the microprocessor is adapted to generate a time stamp related to the RFID tag data and the location data.

4. The monitoring device recited in claim 1, wherein the microprocessor is adapted to generate a time stamp related to the RFID tag data and the location data in regular time intervals and storing the data in the memory.

5. The monitoring device recited in claim 1, wherein the microprocessor is adapted to generate a time stamp related to the RFID tag data and the location data when the article associated to the RFID tag enters the vehicle and/or leaves the vehicle and storing the data in the memory.

6. The monitoring device recited in claim 1, wherein the microprocessor is adapted to generate and evaluate status reports comprising data associated to at least one article in the vehicle.

7. The monitoring device recited in claim 6, wherein the microprocessor is adapted to include data in the status reports relating to at least one of temperature, moisture/humidity, air pressure within the vehicle, technical condition parameters, location, or loading situation of the vehicle.

8. The monitoring device recited in claim 1, wherein the microprocessor is adapted to drop the RFID tag by deleting the RFID tag data from the memory.

9. The monitoring device recited in claim 1, wherein the communication circuit comprises a wireless network interface adapter.

10. The monitoring device recited in claim 1, wherein the communication circuit comprises a transmitter that is adapted to broadcast an RF signal to the RFID tag and a receiver that is adapted to receive an RF signal from the RFID tag.

11. The monitoring device recited in claim 1, wherein the alarm comprises an audible, a visual or a tactile alarm.

12. A tracking system adapted for use in at least one vehicle, comprising at least one radio frequency identification (RFID) tag and a monitoring device, the monitoring device comprising:
a communication circuit adapted to communicate with the at least one RFID tag on an article to be transported by the vehicle;
a position system (PS) circuit adapted to determine a location of the vehicle, a control circuit having a microprocessor and a memory, the control circuit being electrically connected to the communication circuit and the PS circuit;

a computer readable program code stored in the memory and executing under control of the microprocessor, the program code having machine-readable instructions for acquiring the RFID tag data and the location data in the memory, machine-readable instructions for operating the communication circuit to interrogate the RFID tag, machine-readable instructions for operating the PS circuit to determine a location of the vehicle, and machine-readable instructions for associating the RFID tag data with the location data of the vehicle;

an alarm electrically connected to the microprocessor; and whereas the monitoring device is adapted to determine or approximate the distance of the RFID tag from the monitoring device based on a time delay in receiving the RFID tag's response to interrogation and the alarm is activated if a distance threshold of the RFID tag from the monitoring device is exceeded, whereas this distance threshold is lower than the maximum physical range of the RFID tag wherein the microprocessor is arranged to perform a threshold test before an alarm is set, wherein the threshold test determines if the RFID tag has failed to respond to a predetermined number of consecutive interrogations or has failed to respond to interrogation for a predetermined time interval.

13. The tracking system recited in claim 12, wherein the monitoring device and the RFID tag are both adapted to communicate within a wireless personal area network.

14. The tracking system recited in claim 12, wherein the monitoring device comprises a user interface device that is adapted to display messages to and to receive input from a user, the user interface device being electrically connected to the control circuit.

15. The tracking system recited in claim 12, wherein the microprocessor is adapted to generate a time stamp related to the RFID tag data and the location data.

16. The tracking system recited in claim 12, wherein the microprocessor is adapted to generate a time stamp related to the RFID tag data and the location data in regular time intervals and storing the data in the memory.

17. The tracking system recited in claim 12, wherein the microprocessor is adapted to generate a time stamp related to the RFID tag data and the location data when the article associated to the RFID tag enters the vehicle and/or leaves the vehicle and storing the data in the memory.

18. The tracking system recited in claim 12, wherein the microprocessor is adapted to generate and evaluate status reports comprising data associated to at least one article in the vehicle.

19. The tracking system recited in claim 18, wherein the microprocessor is adapted to include data in the status reports relating to at least one of temperature, moisture/humidity, air pressure within the vehicle, technical condition parameters, location, or loading situation of the vehicle.

20. A method of operating a monitoring device for a tracking system adapted for use in at least one vehicle, the method comprising:

communicating with at least one radio frequency identification (RFID) tag on an article to be transported by the vehicle;

determining a location of the vehicle;

acquiring the RFID tag data and the location data;

determining a location of the vehicle;

associating the RFID tag data with the location data of the vehicle;

determining or approximating the distance of the RFID tag from the monitoring device based on a time delay in receiving the RFID tag's response to interrogation; and activating an alarm if a distance threshold of the RFID tag from the monitoring device is exceeded, whereas this distance threshold is lower than the maximum physical range of the RFID tag, wherein the microprocessor is arranged to perform a threshold test before an alarm is set, wherein the threshold test determines if the RFID tag has failed to respond to a predetermined number of consecutive interrogations or has failed to respond to interrogation for a predetermined time interval.

\* \* \* \* \*